(12) United States Patent
Shayne

(10) Patent No.: US 6,318,808 B1
(45) Date of Patent: Nov. 20, 2001

(54) LAWN TRACTOR/DUMP PULL CART SYSTEM WITH A SUPPLEMENTAL WHEEL SET ASSEMBLY

(76) Inventor: Michael R. Shayne, 8211 Tanglewood Dr., New Port Richey, FL (US) 34654

( * ) Notice: Subject to any disclaimer, the term of this patent is extended or adjusted under 35 U.S.C. 154(b) by 0 days.

(21) Appl. No.: 09/656,162

(22) Filed: Sep. 6, 2000

Related U.S. Application Data

(63) Continuation-in-part of application No. 09/511,294, filed on Feb. 23, 2000, now abandoned.

(51) Int. Cl.$^7$ ........................................................ B60P 1/24
(52) U.S. Cl. ............................ 298/178; 298/1 A; 298/5; 298/17 R; 298/17 T
(58) Field of Search .............................. 298/5, 1 A, 17 R, 298/17 B, 17 S, 17 SG, 17 T; 414/485; 280/402

(56) References Cited

U.S. PATENT DOCUMENTS

| | | | |
|---|---|---|---|
| 4,046,274 | * | 9/1977 | Libersky ........................... 414/485 X |
| 4,410,207 | * | 10/1983 | Scharf ................................. 298/17 X |
| 4,711,499 | * | 12/1987 | Fertin ........................................ 298/5 |
| 4,872,728 | * | 10/1989 | Adams ..................................... 298/5 |
| 5,395,163 | * | 3/1995 | Mandell et al. ...................... 298/5 X |
| 5,897,283 | * | 4/1999 | Lenguyen ............................. 298/5 X |
| 5,921,743 | * | 7/1999 | Slagter ................................. 298/5 X |

\* cited by examiner

Primary Examiner—Stephen T. Gordon

(57) ABSTRACT

An accessory for a lawn tractor/dump pull cart system comprises a pair of similarly configured vertical support bars. Each support bar has an L-shaped cross section which provides an interior segment positionable on the rearward face of an associated vertical edge flange. A pair of apertures provided in each interior segment are alignable with apertures of an associated edge flange. Each vertical support bar also has an exterior segment extending forwardly and spaced laterally from the cart. A lower first hole is provided in the exterior segment adjacent to the bottom and a second hole is provided above the first hole. A pair of axles are each formed of a threaded fastener with a small wheel rotatably mounted on an associated fastener at its laterally exterior end. The threaded fastener extends through the second hole and a nut is provided on each side of the exterior segment of the vertical support bar. A horizontal support bar formed in an L-shaped configuration provides a vertical segment positionable in contact with the forward face of a central flange. The horizontal support bar also provides a horizontal segment positionable beneath, and adjacent to the rearward end of, the body. A plurality of holes are provided through the horizontal support bar. The horizontal segment has down turned ends forming tabs with holes aligned with the first holes of the vertical support bars.

3 Claims, 4 Drawing Sheets

LAWN TRACTOR/DUMP PULL CART SYSTEM WITH A SUPPLEMENTAL WHEEL SET ASSEMBLY

RELATED APPLICATION

This application is a continuation in part of U.S. patent application Ser. No. 09/511,294 filed Feb. 23, 2000 and now abandoned.

BACKGROUND OF THE INVENTION

1. Field of the Invention

The present invention relates to a lawn tractor/dump pull cart system with a supplemental wheel set assembly and more particularly pertains to enhancing the safety, utility and convenience of lawn carts coupleable to riding lawn mowers for towing, dumping and spreading.

2. Description of the Prior Art

The use of lawn tractors and dump pull carts of known designs and configurations is known in the prior art. More specifically, lawn tractors and dump pull carts of known designs and configurations previously devised and utilized for the purpose of improving lawn care equipment through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,395,163 to Mandell et al discloses a utility cart and latch assembly therefor. Also, U.S. Pat. No. 4,046,274 to Libersky discloses a power assist hitch for a hay transport. Lastly, U.S. Pat. No. 4,410,207 to Scharb discloses a bumper structure for vehicle having tiltable load carrier member.

While these devices fulfill their respective, particular objectives and requirements, the aforementioned patents do not describe a lawn tractor/dump pull cart system with a supplemental wheel set assembly that allows enhancing the safety, utility and convenience of lawn carts coupleable to riding lawn mowers for towing, spreading and dumping.

In this respect, the lawn tractor/dump pull cart system with a supplemental wheel set assembly according to the present invention substantially departs from the conventional concepts and designs of the prior art, and in doing so provides an apparatus primarily developed for the purpose of enhancing the safety, utility and convenience of lawn carts coupleable to riding lawn mowers for towing, spreading and dumping.

Therefore, it can be appreciated that there exists a continuing need for a new and improved lawn tractor/dump pull cart system with a supplemental wheel set assembly which can be used for enhancing the safety, utility and convenience of lawn carts coupleable to lawn tractors for towing and dumping. In this regard, the present invention substantially fulfills this need.

SUMMARY OF THE INVENTION

In view of the foregoing disadvantages inherent in the known types of lawn tractors and dump pull carts of known designs and configurations now present in the prior art, the present invention provides an improved lawn tractor/dump pull cart system with a supplemental wheel set assembly. As such, the general purpose of the present invention, which will be described subsequently in greater detail, is to provide a new and improved lawn tractor/dump pull cart system with a supplemental wheel set assembly and method which has all the advantages of the prior art and none of the disadvantages.

To attain this, the present invention essentially comprises a dump pull cart. The dump cart includes a rectilinear body. The body has a horizontal base plate. The body also has a vertical extending front plate at the forward end. Vertically extending guide rails are provided rearwardly. The guide rails reciprocably support a gate plate. Vertically extending sidewalls are provided between the front plate and gate plate. A plurality of holes extend through the base plate adjacent to the rearward edge of the base plate. A primary wheel assembly is next provided. The primary wheel assembly includes a pair of laterally spaced axle supports secured to and extending downwardly from a central extent of the base plate. An axle is coupled to the axle supports. A large wheel is provided at each end of the axle beneath the base plate. A vertical central flange is provided. The flange extends downwardly from the body at the rearward end of the body. A pair of similarly configured vertical edge flanges are provided. The vertical edge flanges extend laterally from the body at the rearward end of the body. A pair of vertically aligned holes are provided through each edge flange. Next provided are a pair of similarly configured vertical support bars. Each support bar has an L-shaped cross section providing an interior segment positioned on the rearward face of an associated vertical edge flange. A pair of apertures align with the apertures of its associated edge flange. A pair of threaded fasteners extend through the apertures. Nuts are provided for removable retention purposes. Each vertical support bar also has an exterior segment extending forwardly and spaced laterally from the body. Each vertical support bar is provided with a lower first hole adjacent to the bottom and a second hole above the first hole. A pair of axles are provided. Each axle is formed of a threaded fastener. A small wheel is rotatably mounted on an associated fastener at its laterally exterior end. The threaded fastener extends through the second hole. A nut is provided on each side of the exterior segment of the vertical support bar. A horizontal support bar with an L-shaped configuration is provided. The horizontal support bar provides a vertical segment in contact with the forward face of the central flange. The horizontal support bar also provides a horizontal segment beneath, and adjacent to the rearward end of, the body. A plurality of holes are provided through the horizontal segment adjacent with the holes in the body. Bolts are provided through the holes and nut are provided for releasable coupling. The horizontal segment has down turned ends which form tabs. The tabs are provided with holes aligned with the first holes of the vertical support bars. Threaded fasteners extend through the holes of the tabs and the first holes of the vertical support bars. Nuts are provided on each side of the tabs and on the exterior face of the vertical support bar. The cart system has a forwardly extending tow bar removably coupleable to a riding lawn mower. A spring hinged pivotable latch is provided. The latch is selectively cooperable to a finger extending downwardly from the base plate. In this manner when coupled with the gate plate down, the cart system may be used for towing and when uncoupled with the gate plate up and the cart tipped and resting on the four wheels the cart system may be used for dumping.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn tractor/dump pull cart system with a supplemental wheel set assembly which has all of the advantages of the prior art lawn tractors and dump pull carts of known designs and configurations and none of the disadvantages.

It is another object of the present invention to provide a new and improved lawn tractor/dump pull cart system with a supplemental wheel set assembly which may be easily and efficiently manufactured and marketed.

It is further object of the present invention to provide a new and improved lawn tractor/dump pull cart system with a supplemental wheel set assembly which is of durable and reliable constructions.

An even further object of the present invention is to provide a new and improved lawn tractor/dump pull cart system with a supplemental wheel set assembly which is susceptible of a low cost of manufacture with regard to both materials and labor, and which accordingly is then susceptible of low prices of sale to the consuming public, thereby making such lawn tractor/dump pull cart system with a supplemental wheel set assembly economically available to the buying public.

Even still another object of the present invention is to provide a lawn tractor/dump pull cart system with a supplemental wheel set assembly for enhancing the safety, utility and convenience of lawn carts coupleable to riding lawn mowers for towing and dumping.

Lastly, it is an object of the present invention to provide a new and improved accessory for a lawn tractor/dump pull cart system. First provided is a pair of similarly configured vertical support bars. Each support bar has an L-shaped cross section which provides an interior segment positionable on the rearward face of an associated vertical edge flange. A pair of apertures provided in each interior segment are alignable with apertures of an associated edge flange. Each vertical support bar also has an exterior segment extending forwardly and spaced laterally from the cart. A lower first hole is provided in the exterior segment adjacent to the bottom and a second hole is provided above the first hole. A pair of axles are each formed of a threaded fastener with a small wheel rotatably mounted on an associated fastener at its laterally exterior end. The threaded fastener extends through the second hole and a nut is provided on each side of the exterior segment of the vertical support bar. A horizontal support bar formed in an L-shaped configuration provides a vertical segment positionable in contact with the forward face of a central flange. The horizontal support bar also provides a horizontal segment positionable beneath, and adjacent to the rearward end of, the body. A plurality of holes are provided through the horizontal support bar. The horizontal segment has down turned ends forming tabs with holes aligned with the first holes of the vertical support bars.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
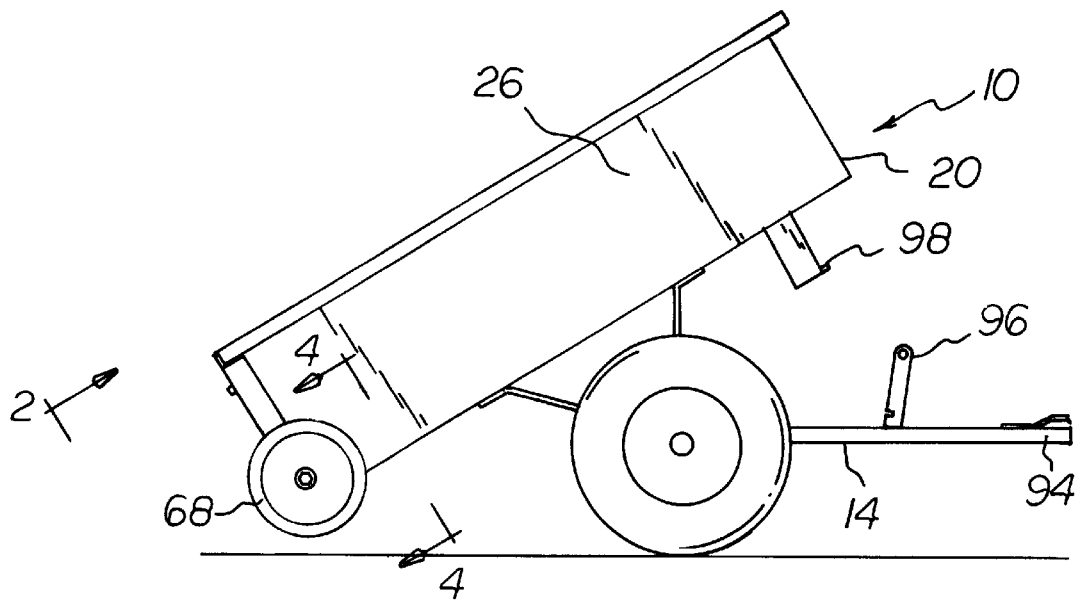
FIG. 1 is a side elevational view of the lawn tractor/dump pull cart system of the present invention with the cart tipped for dumping.
Figure 2:
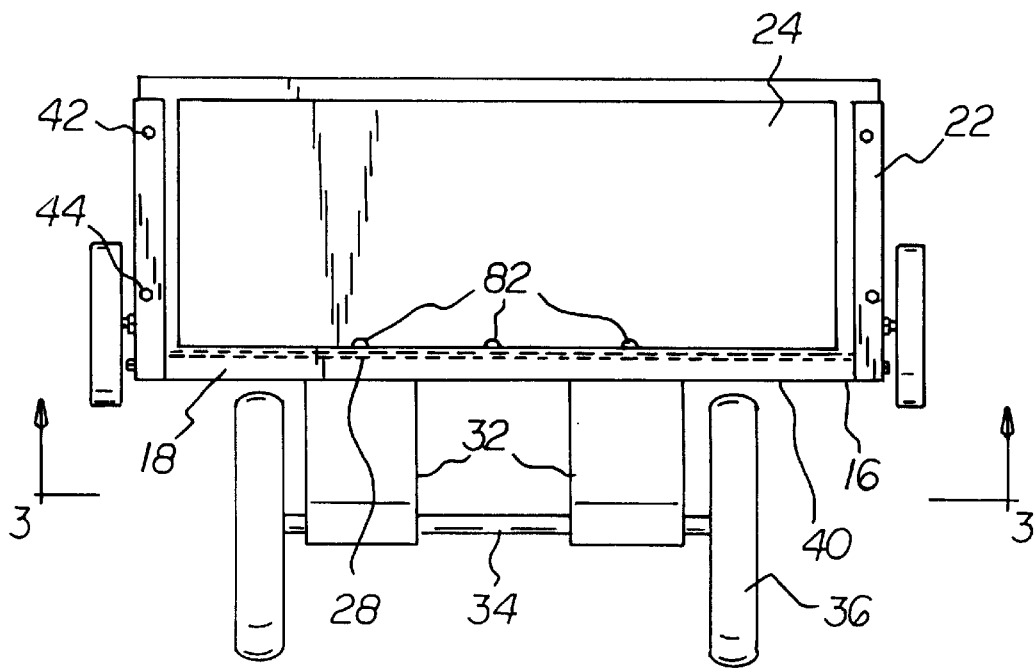
FIG. 2 is a rear elevational view of the system of FIG. 1 taken along line 2—2 of FIG. 1.
Figure 3:
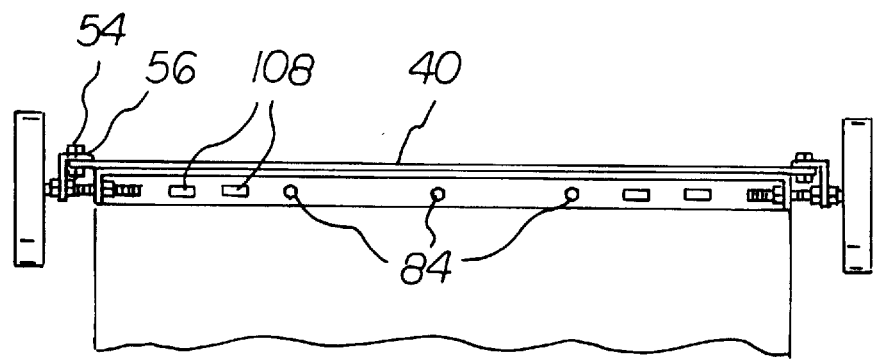
FIG. 3 is a bottom view of the rear end of the system of FIG. 1 taken along line 3—3 of FIG. 2.
Figure 4:
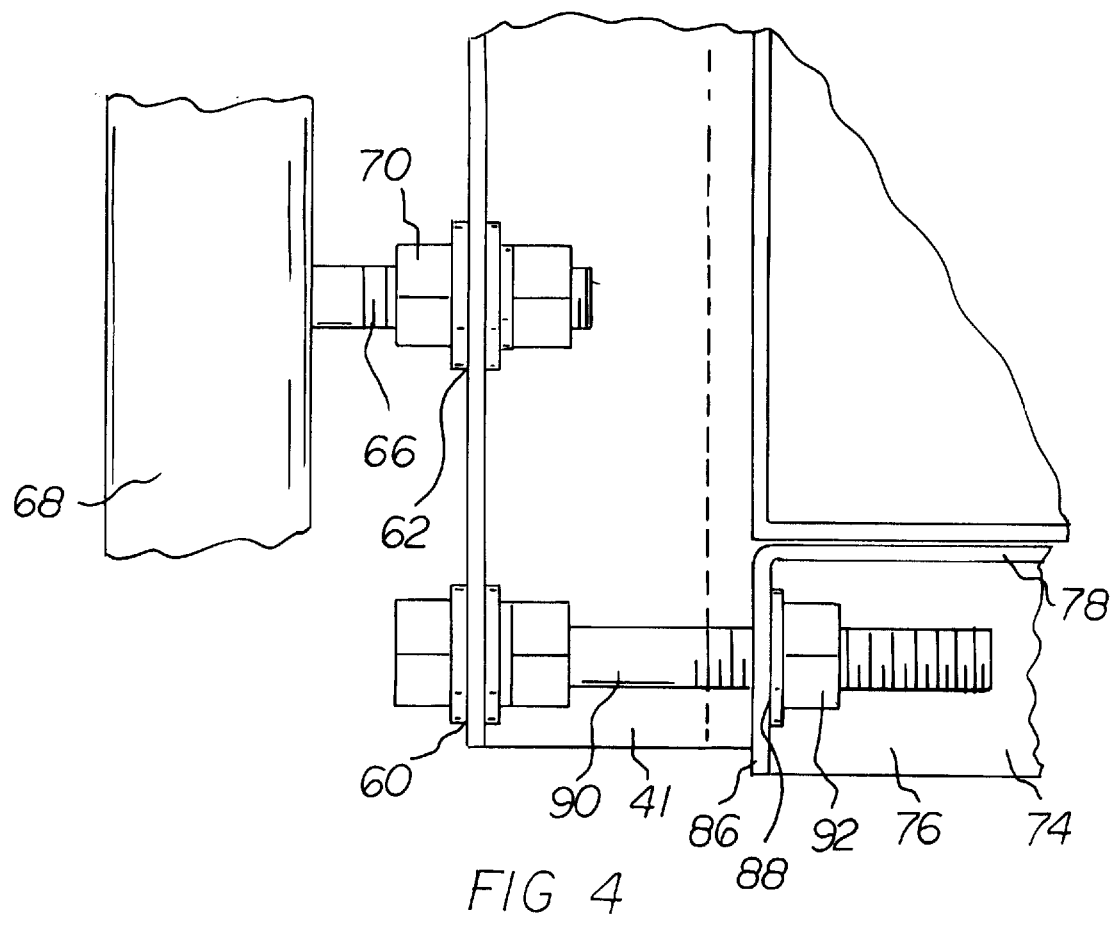
FIG. 4 is an enlarged exploded view taken along line 4—4 of FIG. 1.
Figure 5:
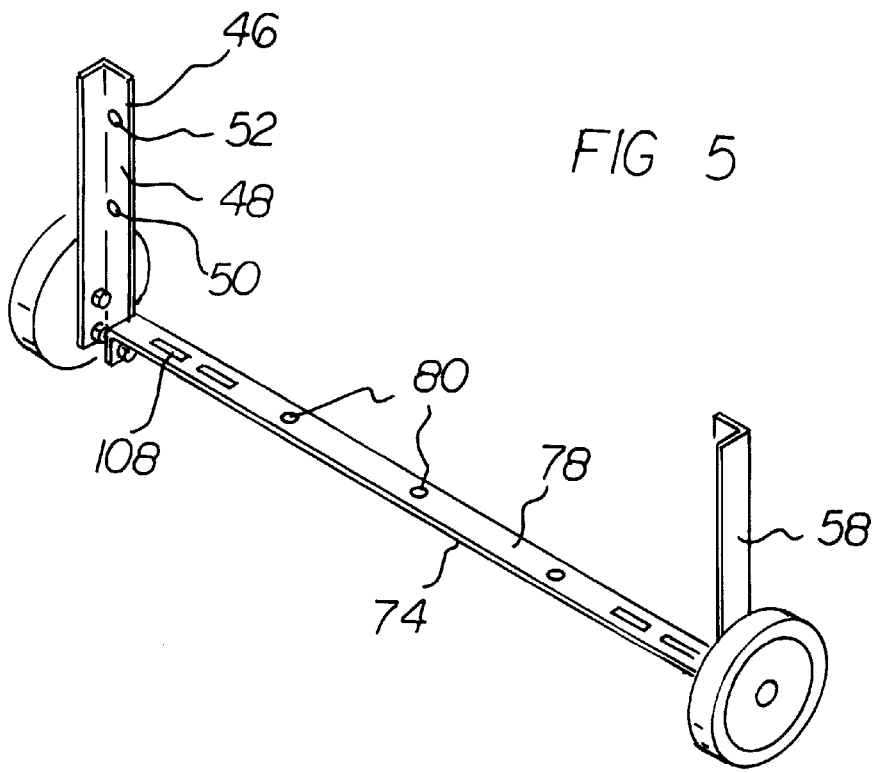
FIG. 5 is a perspective view of the supplemental wheel set assembly shown in the prior figures.

With reference now to the drawings, and in particular to FIG. 1 thereof, the preferred embodiment of the new and improved lawn tractor/dump pull cart system with a supplemental wheel set assembly embodying the principles and concepts of the present invention and generally designated by the reference numeral 10 will be described.

The present invention, the lawn tractor/dump pull cart system with a supplemental wheel set assembly 10 is comprised of a plurality of components. Such components in their broadest context include a pair of similarly configured vertical support bars, a pair of axles, and a horizontal support bar. Such components are individually configured and correlated with respect to each other so as to attain the desired objective.

First provided is a dump pull cart 14. The dump pull cart includes a rectilinear body 16. The body has a horizontal base plate 18. The body also has a vertical extending front plate 20 at the forward end. Vertically extending guide rails 22 are provided rearwardly. The guide rails reciprocably support a gate plate 24. Vertically extending sidewalls 26 are provided between the front plate and gate plate. A plurality of holes 28 extend through the base plate adjacent to the rearward edge of the base plate.

A primary wheel assembly is next provided. The primary wheel assembly includes a pair of laterally spaced axle supports 32 secured to and extending downwardly from a central extent of the base plate. An axle 34 is coupled to the axle supports. A large wheel 36 is provided at each end of the axle beneath the base plate.

A vertical central flange 40 is provided. The flange extends downwardly from the body at the rearward end of the body. A pair of similarly configured vertical edge flanges 41 are provided. The vertical edge flanges extend laterally from the body at the rearward end of the body. A pair of vertically aligned holes 42, 44 are provided through each edge flange.

Next provided are a pair of similarly configured vertical support bars 46. Each support bar has an L-shaped cross section providing an interior segment 48 positioned on the rearward face of an associated vertical edge flange. A pair of apertures 50, 52 align with the apertures of its associated edge flange. A pair of threaded fasteners 54 extend through the apertures. Nuts 56 are provided to insure a rigid 90 degree angle. Each vertical support bar also has an exterior segment 58 extending forwardly and spaced laterally from the body. Each vertical support bar is provided with a lower first hole 60 adjacent to the bottom and a second hole 62 above the first hole.

A pair of axles are provided. Each axle is formed of a threaded fastener 66. A small wheel 68 is rotatably mounted on an associated fastener at its laterally exterior end. The threaded fastener extends through the second hole. A nut 70 is provided on each side of the exterior segment of the vertical support bar.

A horizontal support bar 74 with an L-shaped configuration is provided. The horizontal support bar provides a vertical segment 76 in contact with the forward face of the central flange. The horizontal support bar also provides a horizontal segment 78 beneath, and adjacent to the rearward end of, the body. A plurality of holes 80 are provided through the horizontal segment adjacent with the holes in the body. Bolts 82 are provided through the holes and nut 84 are provided for releasable coupling. The horizontal segment has down turned ends which form tabs 86. The tabs are provided with holes 88 aligned with the first holes of the vertical support bars. Threaded fasteners 90 extend through the holes of the tabs and the first holes of the vertical support bars. Nuts 92 are provided on each side of the tabs and on the exterior face of the vertical support bar. The cart system has a forwardly extending tow bar 94 removably coupleable to a riding lawn mower. A spring hinged pivotable latch 96 is provided. The latch is selectively cooperable to a finger 98 extending downwardly from the base plate. In this manner when coupled with the gate plate down, the cart system may be used for towing and when uncoupled with the gate plate up and the cart tipped and resting on the four wheels the cart system may be used for dumping and spreading.

Figure 6:
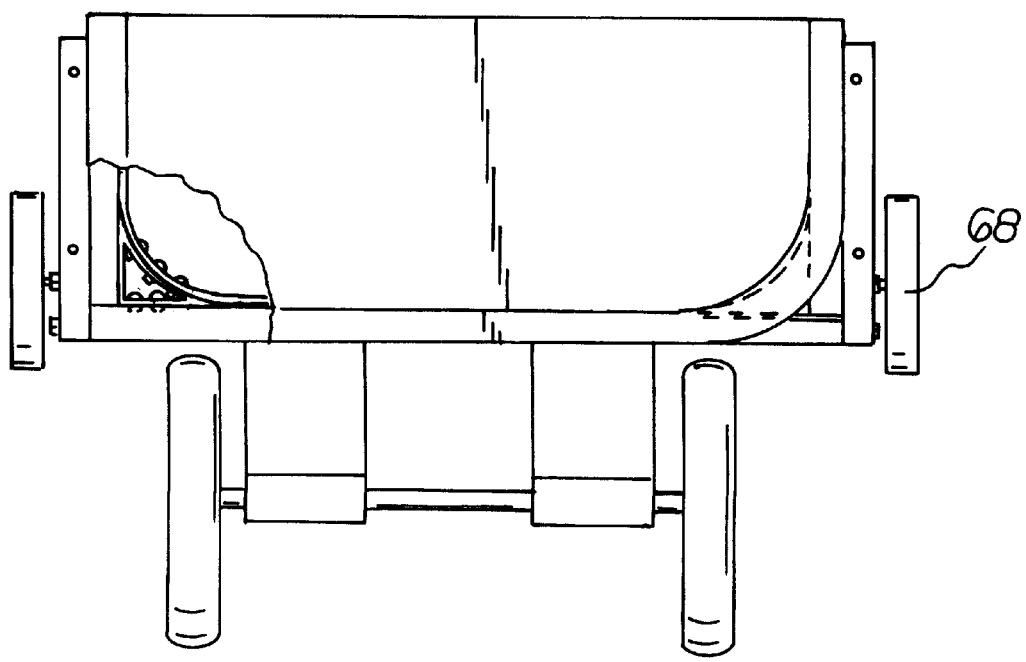
FIG. 6 is a rear elevational view of an alternate embodiment of the invention, similar to that of FIG. 2, but with supplemental triangular support for use with an alternate cart.
Figure 7:
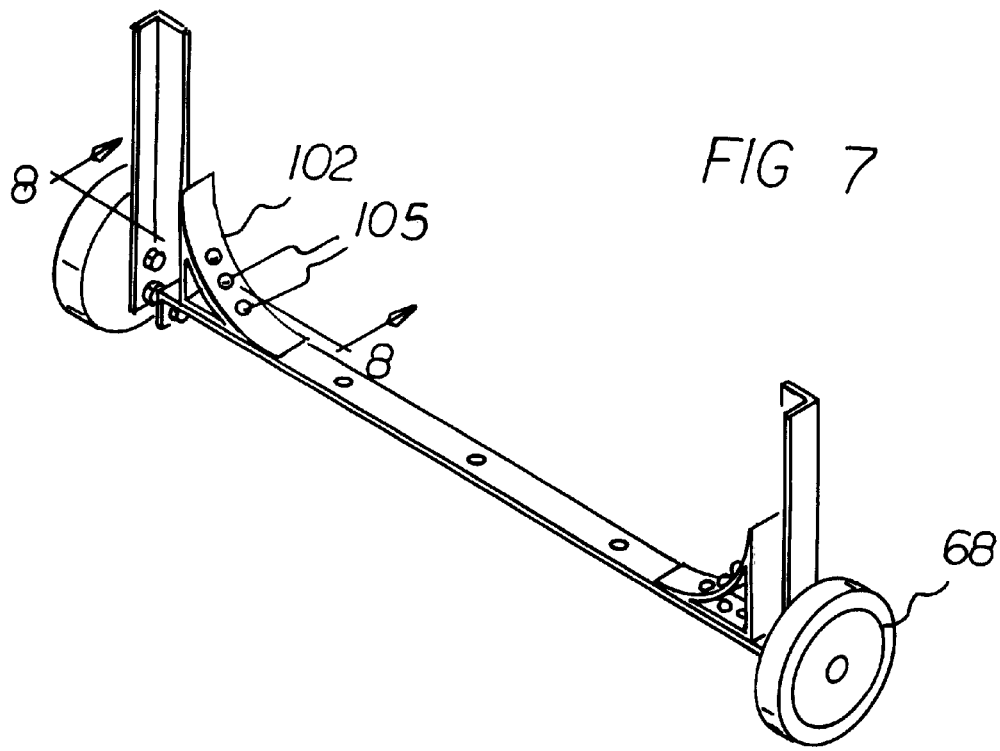
FIG. 7 is a perspective view similar to FIG. 5 but adding the supplemental supports of the alternate embodiment.
Figure 8:
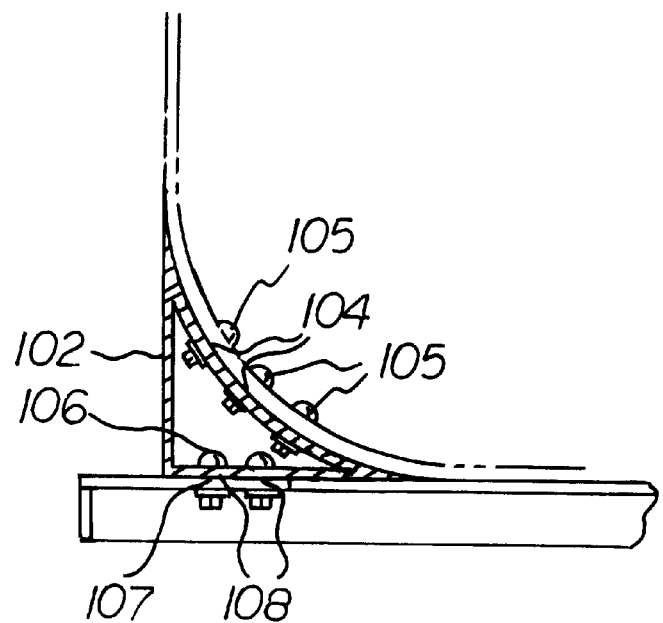
FIG. 8 is a cross sectional view taken along line 8—8 of FIG. 7.

In an alternate embodiment of the invention designed for use with carts having rounded bottoms and sides, generally triangular supports 102 are provided. Note FIG. 6. The generally triangular support has a horizontal segment, an upstanding vertical segment and a curved segment there between. Three holes 104 in the curved segment of the triangular support allow coupling to the cart with preferably ⅜×1 inch dimensioned carriage bolts 105. Two carriage bolts 106 of preferably ⅜×1¼ inch dimensions extend through holes 107 in the horizontal segment of the triangular support and into slots 108 in the horizontal support bar to allow for lateral adjustment. The ends of the carriage bolts are rounded to prevent snagging or catching material in the cart.

This invention relates to a modification to dump carts which are used with riding lawn mowers or tractors and/or other mechanical means of towing. This invention can be either incorporated in the manufacturing of, or can be retrofitted to existing, dump carts or other two wheeled utility trailers.

A dump pull cart is usually constructed of either metal or plastic and consists of a five-sided box with an open top mounted on a draw bar that is designed to be attached to a riding lawn mower or tractor. The rear wall of the box is slidable or removable or hinged to allow for dumping of material such as sand, dirt, gravel, etc. Two pneumatic wheels are attached to a cross beam perpendicular to the draw bar and offset to the box to allow for a gravity forced dumping of material. The back, or rear, of the dump pull cart is vulnerable to damage from excessively forced contact with the ground. Spreading of material is also not possible. By adding two small wheels on the back of the dump cart in a way that does not violate the integrity of the design of the dump cart increases its usefulness in dumping and spreading of material, and in storage when not in use.

Dump pull carts are accessories that are used with lawn tractors and towed behind the riding lawn mower or tractor. They are designed to carry dirt, sand, gravel, tools, etc. and have the capability to dump the contents onto the ground. A dump pull cart is usually constructed of either metal or plastic and consists of a five sided box with an open top mounted on a draw bar that is designed to be attached to a lawn tractor or other mechanical device. The rear wall of the box is removable or hinged to allow for dumping of material. The box is mounted to the draw bar which is attached to an axle which is placed forward of the center of the box. Two pneumatic wheels are attached to the axle to allow for ease of towing across diverse terrain. A latching mechanism is attached to the draw bar which allows the user to dump the contents of the box when the rear wall of the box is removed or pivoted in the open position. Unfortunately, the rear edge of the box is forced to come in contact with the ground in such a way that through time damage will be caused to the rear of the box. Furthermore, spreading of the material is not possible without further damage to the rear of the box because it would be forced to be dragged across the ground or other horizontal surfaces.

The present invention eliminates these problems and also allows for easy storage and movement of the dump pull cart when not in use. Attaching two small wheels to the rear of the box in such a way that does not damage the integrity of the original product and does not significantly change the range of application of the original product's design significantly increases both the range of the application and durability of the original product.

The rear of most dump pull carts have either a right angle flange or a reinforcing member attached to the vertical sidewalls of the cart to maintain the integrity of the rear sidewalls of the cart because the rear back wall of the cart is removable. Attaching a piece of steel, angle steel, to the back rear sidewalls of the dump pull cart provides lateral support for the sidewalls of the box when the back wheels are attached. A horizontal cross member, angle steel, is attached to the lower ends of the lateral supports to provide additional support to the rear sidewalls and bottom of the existing dump pull cart. Two small wheels are attached to the lateral supports and are parallel to the two larger pneumatic wheels that come supplied with the existing dump pull cart. The two smaller wheels are adjusted to allow for minimum ground clearance so as not to intrude on the original product's design specifications.

The dump pull cart has no way of dispensing its load without causing damage to the rear edge of the dump pull cart; nor does the dump pull cart have away of spreading its contents without damaging the rear of the dump pull cart that comes in contact with the receiving surface upon which the contents would be spread.

The back wheels allow the dump pull cart to rest on the ground or any other medium or hard surface when either in a dump, spread, or storage mode. In this manner, any damage that could occur to the body of the dump pull cart from resting on the ground or other surface is eliminated.

This invention is designed to improve the overall usefulness of lawn tractor pulled dump carts. The embodiments of this invention can be used with any two wheeled utility trailer regardless of the means by which the trailer is pulled.

The exact shapes and sizes of the components described are not essential to the invention unless specified. The invention will be initially described as being attached to a flat bottom rectangular dump pull cart which will be depicted in a normal operating mode.

An additional component to the invention will also be described to depict the invention attached to a rounded bottom dump pull cart.

The invention is preferably attached to the dump pull cart with ⅜th inch diameter carriage bolts. The invention is attached in such a way as to leave approximately a 1 inch clearance between the rear of the dump pull cart and the ground surface. This allows the dump pull cart to be rolled in either a two wheel loading position or a four wheel dumping, spreading, or storage position.

In the preferred embodiment, 1½ inch 90-degree angle steel is used for the construction of the frame. The horizontal support has two small steel plates welded to the ends of the horizontal support to insure a secure anchoring support for the two vertical sides. The sides are attached to the horizontal support by two ½ inch×6 inch bolts. These bolts allow the invention to be adjusted to fit different width dump pull carts and to provide a firm 90 degree support for the side members. Two 7 to 8 inch tires that have metal bushing and hubs are attached to the side members by two ½ inch×3½ inch bolts that only have threads on the last 1½ inches of the bolts. These bolts form the stub axles for the two small rear wheels and are attached to the side members with two nuts and one washer on the outside of each side support and with one nut on the inside of the side supports to allow for adjusting the freedom of movement of the two small wheels and to firmly lock and secure the adjusted stub axles to the side members.

The primary embodiment of the invention is attached to the existing dump pull cart by means of three ⅜ths inch diameter carriage bolts which are placed in holes. Slots also receive ⅜th inch diameter carriage bolts which also help to secure the embodiment of the invention to the dump pull cart. Slots also allow support for securing the additional attachments to the embodiment of the invention to dump pull carts that have a rounded bottom and/or side formations which are contiguous and absent of any sharp angle structural bends.

In the alternate embodiment of the invention, two additional support members allow the invention to be attached to dump pull carts that have a rounded bottom and/or side formations which are contiguous and absent of any sharp angle structural bends.

Support members are identical. Slots allow for ⅜th inch diameter carriage bolts which provide lateral adjustment to support members. This allows the invention to be adjustable so it can be securely fitted to different width dump pull carts that have a rounded bottom and/or side formations which are contiguous and absent of any sharp angle structural bends. The opposite support member is attached in the same manner. Holes allow for ⅜th inch diameter carriage bolts which help to attach the invention to a dump pull cart that has a rounded bottom and/or side formations which are contiguous and absent of any sharp angle structural bends. The support member attaches to the embodiment of the invention to the dump pull cart that has a rounded bottom and/or side formations which are contiguous and absent of any sharp angle structural bends in the same way.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn tractor/dump pull cart system with a supplemental wheel set assembly for enhancing the safety, utility and convenience of lawn carts coupleable to riding lawn mowers for towing, spreading and dumping comprising, in combination:

a dump pull cart including a rectilinear body with a horizontal base plate and with a vertical extending front plate at the forward end with vertically extending guide rails reciprocably supporting a gate plate rearwardly and with vertically extending sidewalls there between, the base plate having a plurality of holes extending there through adjacent to the rearward edge thereof;

a primary wheel assembly including a pair of laterally spaced axle supports secured to and extending downwardly from a central extent of the base plate with an axle coupled thereto and with a large wheel at each end of the axle beneath the base plate;

a vertical central flange extending downwardly from the body at the rearward end thereof and a pair of similarly configured vertical edge flanges extending laterally from the body at the rearward end thereof, each edge flange having a pair of vertically aligned holes there through;

a pair of similarly configured vertical support bars each with an L-shaped cross section providing an interior segment positioned on the rearward face of an associated vertical edge flange with a pair of apertures aligned with the apertures of an associated edge flange and with a pair of threaded fasteners extending there through with nuts for removable retention purposes allowing for a monolithic frame to insure the weight is redistributed to the rear wheels when in a dumping mode, each vertical support bar also having an exterior segment extending forwardly and spaced laterally from the body with a lower first hole and a second hole there above;

a pair of axles each formed of a threaded fastener with a small wheel rotatably mounted on an associated one of said fasteners at a laterally exterior end and with the threaded fastener extending through the second hole with a nut on each side of the exterior segment of the vertical support bar; and a horizontal support bar with an L-shaped configuration, the horizontal support bar providing a vertical segment in contact with a forward face of the central flange, the horizontal support bar also providing a horizontal segment beneath the body adjacent to the rearward end thereof with a plurality of holes there through adjacent with the holes in the body and with bolts there through with nuts for releasable coupling there between, the horizontal segment having down turned ends forming tabs with holes aligned with the first holes of the vertical support bars and with threaded fasteners extending through the holes of the tabs and the first holes of the vertical support bars and with nuts on each side of the tabs and on the exterior face of the vertical support bar, the cart system having a forwardly extending tow bar removably coupleable to a riding lawn mower with a spring hinged pivotable latch selectively cooperable to a finger extending downwardly from the base plate whereby when coupled with the gate plate down, the cart system may be used for towing and whereby when uncoupled with the gate plate up and the cart tipped and resting on the four wheels the cart system may be used for dumping and spreading.

2. An accessory for a lawn tractor/dump pull cart system comprising:

a pair of similarly configured vertical support bars, each with an L-shaped cross section providing an interior segment positionable on the rearward face of an associated vertical edge flange with a pair of apertures alignable with the apertures of an associated edge flange, each vertical support bar also having an exterior segment extending forwardly and spaced laterally from the cart with a lower first hole and a second hole there above;

a pair of axles each formed of a threaded fastener with a small wheel rotatably mounted on an associated one of said fasteners at a laterally exterior end and with the threaded fastener extending through the second hole with a nut on each side of the exterior segment of the vertical support bar; and a horizontal support bar with an L-shaped configuration, the horizontal support bar providing a vertical segment positionable in contact with a forward face of the central flange, the horizontal support bar also providing a horizontal segment positionable beneath the a cart body adjacent to the rearward end thereof with a plurality of holes there through, the horizontal segment having down turned ends forming tabs with holes aligned with the first holes of the vertical support bars.

3. The system as set forth in claim 2 and further including a generally triangular support having a horizontal segment, an upstanding vertical segment and a curved segment there between, bolts couple the curved segment to the cart through adjacent holes in the support and cart, furthermore bolts couple through holes in the horizontal segment of the triangular support into slots in the horizontal support bar to allow for lateral adjustment.

\* \* \* \* \*